INVENTOR
WARREN L. HOLFORD

INVENTOR
WARREN L. HOLFORD
BY
ATTORNEY

United States Patent Office 3,508,065
Patented Apr. 21, 1970

3,508,065
RADIATION SENSITIVE IMAGE ANALYZER
USING MULTIPLE ANGLE LINE SCAN
Warren L. Holford, 6001 Greeley Blvd.,
Springfield, Va. 22150
Filed Sept. 25, 1963, Ser. No. 311,489
Int. Cl. G01n 21/30; H01j 39/12, 3/14
U.S. Cl. 250—219                    8 Claims

ABSTRACT OF THE DISCLOSURE

An image analyzer which, on the one hand, provides information characterizing the shape of the image being analyzed independent of its position or rotation on the processing field and which, on the other hand, provides useful information as to the relative position of the image in the field. The image analyzer employs a time integral scan wherein a plurality of scanning lines are swept successively across the image at differing angles to produce a continuous repetitive waveform.

---

The invention described herein may be manufactured and used by or for the Government of the United States for governmental purposes without the payment to me of any royalty thereon.

This invention relates to image analyzers and, more particularly, to image analyzers employing a line integral scan for producing a continuous repetitive waveform and improved means for analyzing this wave form.

In order to meet the need for devices for automatically interpreting photographs or otherwise recognizing visual patterns, a number of systems for analyzing images have been proposed in the prior art. These systems customarily use point-by-point scanning of the image, but either fail to preserve image continuity in the time domain or require complicated processing to restore it. In addition, a point-by-point scan is equally responsive to individual points of high contrast "noise" on the field as it is to data associated with the image. Other prior art systems, involving the use of coherent light and Fraunhoffer defraction, are quite critical in terms of optical sophistication; and little progress toward a practical system of this type has been made. Additional approaches, using random black and white masks to extract image data in conjunction with an adaptive system of the perception variety to learn and recognize images, have not produced encouraging results.

Accordingly, it is the principal object of this invention to provide an improved image analyzer which avoids the drawbacks of such prior art systems.

Another object of the invention is the provision of scanning means based on the principle of the conical transform for effecting a line integral scan of an image.

An additional object is the provision of improved means for analyzing the wave form thus produced to provide useful information as to the character of the image being analyzed.

A further object of the invention is the provision of an image analyzer which, on the one hand, will provide information characterizing the shape of the image being analyzed independent of its position or rotation on the processing field and which, on the other hand, will provide useful information as to the relative position of the image in the field.

Briefly, the invention contemplates scanning the image to be analyzed by relatively sweeping a succession of scanning lines thereacross, each at an angle differing slightly from that of its predecessor, and producing a continuous repetitive waveform which is a function of the integral of the light values of the portion of the image within the scanning lines as they sweep thereacross.

In a first embodiment, the image being analyzed is reflected by a rotating inclined mirror upon the inner cylindrical surface of a sampling cylinder concentric therewith. A plurality of reflective grid lines, which are provided on the cylindrical surface, successively sweep across the reflection of the image as it translates along the cylindrical surface. Suitable photoelectric means are provided to respond to the reflection from the reflective grid lines to produce the waveform. Alternatively, in a second embodiment of the invention, the reflective grid lines upon the inner surface of the cylinder are reflected by means of the rotating inclined mirror upon the image to be analyzed. This causes the reflections of the grid lines to sweep across the image successively at differing angles. A photo-multiplier is responsive to the integral of the light values of the portion of the image within the scanning lines as they sweep thereacross to produce a continuous waveform replica of the image. The waveforms produced by these embodiments may be subjected to spectrum analysis by means of a plurality of band pass filters which separate the wave into frequency bands. At least one of the frequency bands is rectified by means of a detector which is coupled to a second plurality of frequency bands to subdivide the detected signal into a second plurality of frequency bands. All of the outputs of the first and the second plurality of band pass filters may be coupled to a plurality of indicator lamps to provide a visual read-out.

The foregoing and other objects, advantages, and features of the invention and the manner in which the same are accomplished will become more readily apparent from the consideration of the following detailed description of the invention taken in conjunction with the accompanying drawings, which illustrate preferred and exemplary embodiments, and wherein.

Figure 1:
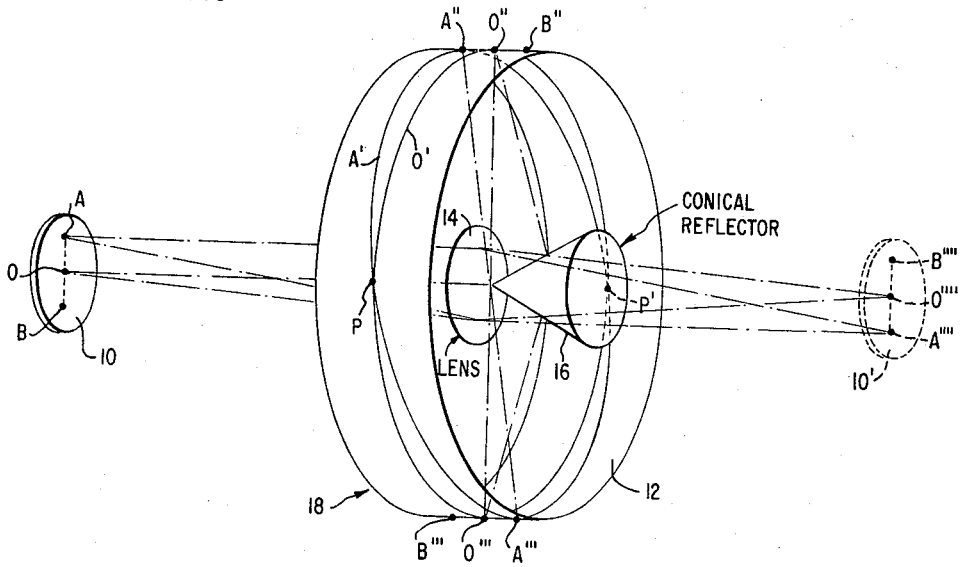
FIGURE 1 is a perspective view illustrating theoretical principles of the conical transform utilized in the scanning systems of the invention.

The scanning systems employed in the image analyzers of the invention utilize a line integral scanning process wherein a plurality of scanning lines are successively swept across an image to be analyzed, and photo-electric means, such as a photo-multiplier tube, is illuminated by the portion of the image covered by the scanning lines to produce a signal which is a function of the integral of the light values of the portion of the image within the area covered by a scanning line as it sweeps across the image. This scanning process is implemented by employing the principle of the conical transform for a reflecting cone of ninety degree apex angle. This is illustrated in FIGURE 1 where a plane, two-dimensional image represented by the image field 10 is uniformly distributed over a cylindrical surface 12. The image, which in this illustration is in the form of a line AOB, is projected through a converging lens 14 and reflected by a conical reflector 16, which is in the form of a cone of ninety degree apex angle, upon the inner cylindrical surface 12 of a sampling cylinder 18. It will be observed that the center of the image field 10 and the axis of the conical reflector 16 lie on the axis of cylinder 18. Due to the prevailing circular symmetry, the image of point O, which corresponds to the center of image field 10, becomes a circle O', whose center lies at the apex of conical reflector 16. The image of a point A is a near circle A', including points A'' and A''' on opposite sides of image O', which intersects image O' at points P and P'. Likewise, the image of a point B at the other end of line AOB will become a near circle (not shown) connecting points B'' and B''' which also intersects the image O' at points P and P', being however on opposite sides of image O' from image A' at all other points. It will thus be observed that the image A''O''B'' of line AOB at the upper end of cylindrical surface 12 (as seen in FIGURE 1) and the image A'''O'''B''' of the line at a point 180° removed therefrom are oppositely directed with respect to the edges of the surface. This reversal of the image may be explained with reference to the optics of lens 14 and conical reflector 16 which have an inverted virtual image 10' (note image A''''O''''B''''). Since the images of all points on the line AOB have the common intersection points P and P', these points constitute a contour or line integral of the image field intensity on that line. While line AOB is shown in FIGURE 1 as a straight line, it is to be understood that this is essentially an approximation. In actual practice, the contour line corresponding to a pair of points, such as P and P' on the cylindrical surface, will be curved in the form of a cycloid. However, the smaller the field angle of the optics, the closer will the contours approximate straight lines.

Figure 2:
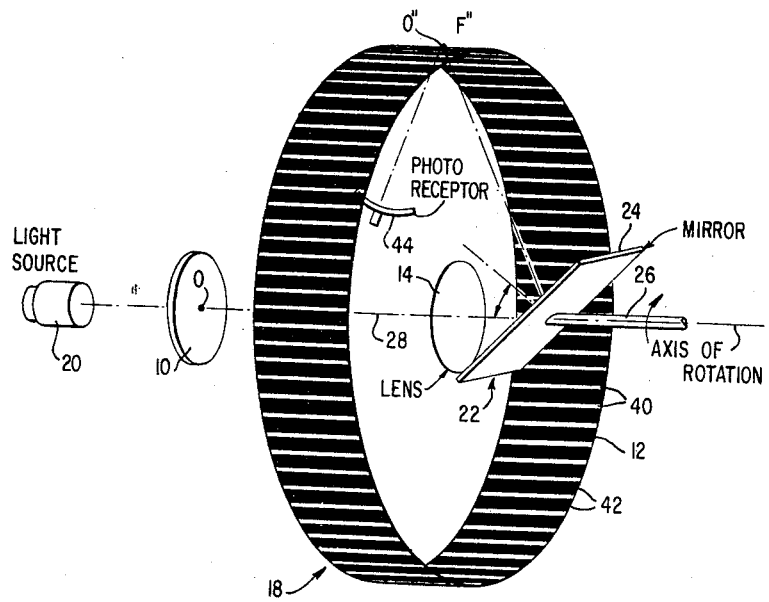
FIGURE 2 is a perspective view illustrating the scanning system employed in a first embodiment of the invention.

A practical implementation of a scanning system of the invention is shown in the embodiment illustrated in FIGURE 2. As shown in this figure, the image from the image field 10, which is provided in the form of a transparency, will be projected by means of a light source 20 through coverging lens 14 upon a rotating mirror assembly 22 which, in this practical embodiment, replaces the conical reflector 16. The rotating mirror assembly comprises a plane mirror 24, which intersects the optical axis 28 of image field 10 and is inclined at an angle of forty-five degrees thereto, mounted upon a rotating shaft 26, which lies on the optical axis 28. It will be observed that as mirror 24 rotates it defines a substantially conical reflecting surface and is thus essentially equivalent to the conical reflector 16 of FIGURE 1. In this way, the image field 10 is reflected from the rotating mirror 24 upon the inner surface 12 of sampling cylinder 18.

Figure 3:
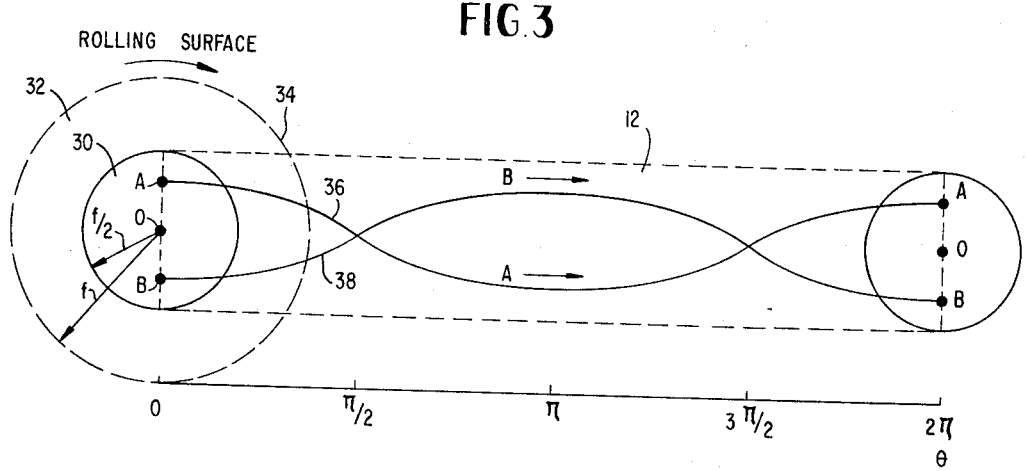
FIGURE 3 is a diagram illustrating the translation and rotation of the image in the scanning system of FIGURE 2.

FIGURE 3 illustrates the manner in which an image 30 reflected upon the inner surface 12 by rotating mirror 24 will translate along the surface. The image 30 may be considered as moving in the same way as a central portion of radius $f/2$ of a rolling body 32, having a rolling surface 34 of radius $f$. As the rolling surface rolls along a plane surface, the portion 30 will both translate and rotate. Again considering the portion 30 as an image, this will cause image points A and B to follow the paths 36 and 38 and thus reverse positions after traversing $\pi$ radians of the surface and return to their original positions after traversing $2\pi$ radians. This will be explained by again referring to the cylindrical surface 12 as shown in FIGURE 1 where the image of point A, for example, was seen to move from one edge of the cylindrical surface to the other edge due to the geometry of the conical reflector. Since the rotating mirror 24 effectively presents a conical reflecting surface equivalent to the conical reflector 16 of FIGURE 1, the image reflected therefrom will also change positions in this way as it traverses the cylindrical surface 12. The image will complete one revolution as it traverses the circumference of the cylinder 18, and the image is thus translated and rotated simultaneously as the mirror 24 rotates.

Extraction of image data information is obtained by providing the inner surface 12 of cylinder 18 with a plurality of alternate reflective (white) grids 40 and absorptive (black) grids 42. A photo-receptor 44, such as a photomultiplier tube, is suitably located with respect to the inner surface 12 of cylinder 18 so that the reflection of an image translating therealong will be received by it to generate a video signal corresponding to the contour integral data of the image. The photo-receptor 44 may be mounted for rotation with mirror 24, or one or more stationary receptors may be so located as to receive reflections from all portions of surface 12. The image is thus made to traverse a black and white grid on cylindrical surface 12, while a light sensitive device 44 generates a video signal as parts of the image are alternately absorbed or reflected by the grid.

Figure 4:
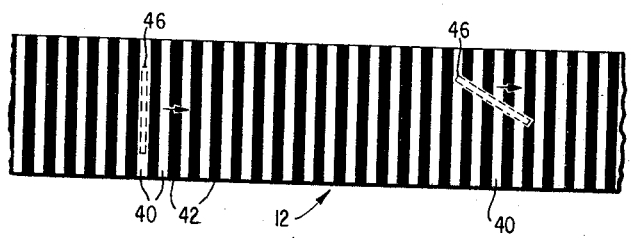
FIGURE 4 is a fragmentary view showing the rotation of an image as it traverses a grid on a sampling cylinder of the invention.

As shown in FIGURE 4, an image in the form of a line 46 will assume various angles with respect to the reflective lines 40 and absorptive lines 42, which, in this case, are of equal width, as the image translates along the cylindrical surface 12. Thus, at the left side of the segment of surface 12 shown in FIGURE 4, the image 46 is parallel to the grid, while at the right side of the segment the image 46 has assumed a sharp angle therewith. The signal at any instant is thus dependent upon the slope of the image and how it is oriented with respect to the grid.

Figure 5:
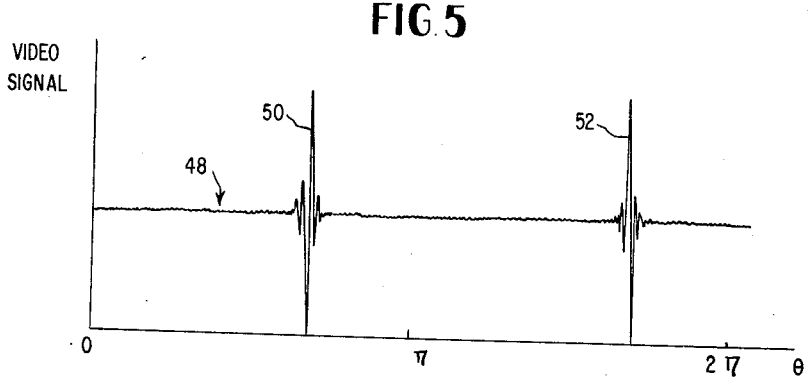
FIGURE 5 is a diagram illustrating the waveform generated by the image of FIGURE 4.

An example of the video wave form derived from such a simple line image is shown in FIGURE 5. The wave form 48 contains two impulses 50 and 52 which correspond with the locations along cylindrical surface 12 where the line 46 is in alignmnent with a reflective grid line 40. Since this will occur twice during each rotation of mirror 24, two impulses 50 and 52 are generated.

A sampling grid of the type shown in FIGURE 4 will derive only a small amount of information concerning the image, and a more effective sampling technique is required to derive complete information which describes the image structure. This is accomplished by substituting a special sampling grid upon surface 12. Thus, as shown in FIGURE 2, the grid comprises very narrow reflective sampling grid lines 40 having a rather wide separation 42 therebetween. Ideally, the separation is such that the image is being swept across only one sampling grid line 40 at a time. The video wave form generated by this sampling method becomes a series of pulses, each pulse being a continuous series of line integrals effected by the grid lines 40 as they sweep across the image. Because the orientation with respect to the image of each successive grid line 40 which sweeps by is different, the image data derived by each grid is, in general, uncorrelated with that obtained from any other grid. Since the mirror rotation is a continuous motion, the pulse train is a continuous repetitive signal with a period equaling the time of one mirror rotation. The speed of rotation of the mirror is not critical; but, in general, the more rapid the rotation, the shorter will be the response time of the analyzer. Rapid rotation will also provide a wider band signal which may be subjected to finer spectrum analysis, as will be explained hereinafter. If an even number of grid lines 40 are provided on cylindrical surface 12, the impulses generated by grids 180° apart will be mere images of one another. In addition, it should be noted that each grid line will negotiate a small angle of rotation as its sweeps across the image field.

In a rigorous analysis, it can be shown that each point of the image contributes an independent component to the voltage wave form derived from the integral scan method. The impulse transform of a point of the image is a series of impulses which are pulse-position modulated by a sine or cosine function whose argument (or phase) is the angle made by the line from the point to the optical axis with some reference line and whose amplitude is proportional to the displacement of the point from the optical axis. The optical axis in this context refers to the point on the image field which coincides with the primary optical axis of the optical system (in FIGURE 1, for example, ths would be point O).

Because the shape of individual impulses for a given image is governed only by the angle at which the grid lines sweep across the image, there is substantially no change in the appearance of the impulses as the image is translated in the field of veiw. The impulses generated at certain times during the cycle will be either advanced or delayed in time slightly as the image is shifted in the field. Slight change in an impulse or image signature result, however, because of the slight grid line rotation ocurring during its sweep across the field. This change will be marked by a slight pulse stretching for some grid lines with an equal and opposite compression of the pulse generated by grid lines 180° away on the surface 12 and by subtle variations of the frequency content of the wave form. As will be explained more fully hereinbelow, these frequency variations, which may be characterized as "circular harmonics," may be detected to provide information as to the position of the image in the field.

It will be apparent, that the line integral scan technique offers an excellent means for image data extraction, regardless of the ultimate use of the voltage wave form derived. It has been found that one integral scan across the field fails to yield sufficient information to characterize images of any complexity. Accordingly, the scanning system defines an arbitrarily large number of uncorrelated integral scans which can be taken in a very simple fashion. The greater the number of grids used on the cylinder, the more information will be extracted concerning the image. The integral scan process may be characterized as the taking of many one-dimensional looks at a two-dimensional field. Indeed, the sequnetial acquisition of image data is much the same as that performed by a human who learns the characteristic of a three-dimensional object by taking successive observations through the two-dimensional retinal image. An important characteristic of the line integral scan is that regardless of the position or orientation of the image on the field, the impulses generated by the scan do not show any substantial change. This characteristic is completely absent in conventional point-by-point scan systems. Moreover, the line integral scan will be less sensitive to individual points of high contrast "noise" than point-by-point scan systems; the line integral scan can transfer the bulk of the information concerning an image without giving much weight to isolated points of noise.

Figure 6:
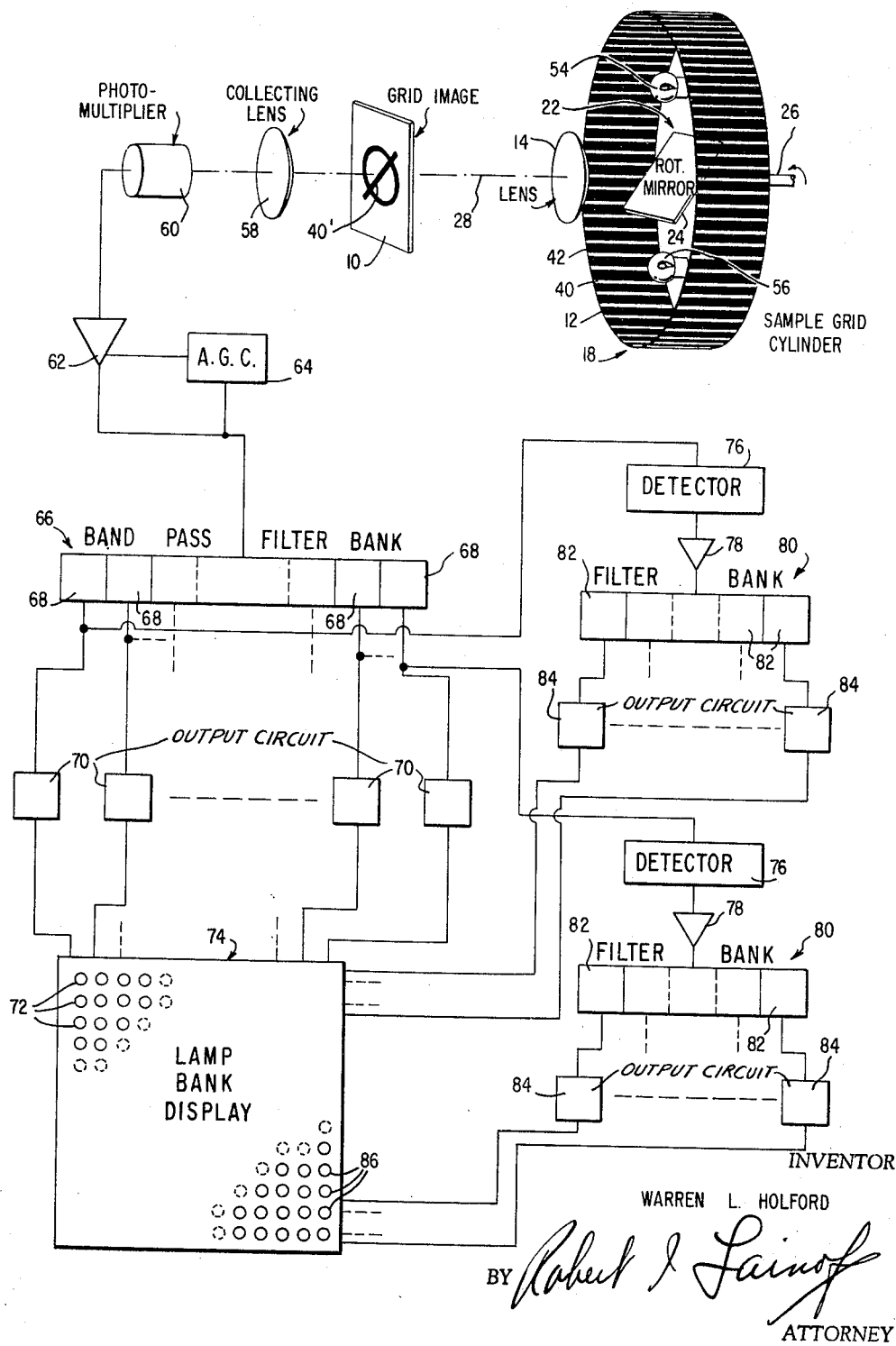
FIGURE 6 is a combined perspective view of a second embodiment of a scanning system of the invention and a circuit diagram of the system for analyzing the waveforms generated by the scanning systems of the invention.

Although the scanning system of FIGURE 2 follows logically from the principles of the conical transform as illustrated in FIGURE 1, a more practical physical implementation of a line integral scanning system is illustrated in the embodiment of FIGURE 6. This embodiment may be considered as the converse of the embodiment of FIGURE 2. That is, instead of projecting the image from the rotating mirror 24 upon the cylindrical surface 12, the grid lines 40 on the cylindrical surface 12 are illuminated by illumination sources 54 and 56 so that they may be reflected from rotating mirror 24 through lens 14 upon the image field 10 to cause reflections 40' of the grid lines 40 to sweep thereacross for scanning the image. The illumination sources 54 and 56, which may be ordinary electric lamps, are provided with suitable shields (not shown) for preventing direct illumination of rotating mirror 24. It will be observed that reflective grid lines 40 and absorptive grid lines 42 are provided with the same relative dimensions as in FIGURE 2, lines 42 being much wider than grid lines 40. The rotating mirror 24 is disposed in the same manner as in FIGURE 2; that is, it intersects the optical axis 28, is inclined at an angle of forty-five degrees thereto, and is rotated by a rotating shaft 26 coinciding with the optical axis 28. Since image field 10 is again provided in the form of a transparency, light from the illumination sources, as reflected by the grid lines 40 and rotating mirror 24, passes through the image field 10, is modified in intensity in accordance with the integral of the light values of the portion of the image field within the area of projected grid line 40', is collected by lens 58, and delivered to a photo-multiplier tube 60. Inasmuch as the optical geometry is substantially similar to that of the embodiment of FIGURE 2, except for the reversal of direction of the projection of the light, it will be understood that the image field and the grid lines will effectively change relative positions in much the same way, as the translation and rotation of the image field along the cylindrical surface 12 in the embodiment of FIGURE 2. Thus, successive reflected grid lines will sweep the image field at slightly different angles and rotate slightly as they sweep thereacross. In the case where thirty-nine reflective grid lines 40 are disposed about the cylindrical surface 12, the grid scanning lines will approach the image at angles differing by nine degrees from each other. Thus, as the mirror is rotated the projected grid lines sweep across the image field 10, each at an angle some nine degrees different from that of its predecessor. It is to be understood that the video impulses generated by photo-multiplier 60 will form a continuous repetitive wave form substantially identical to that generated by photo-receptor 44 of the embodiment of FIGURE 2.

An important aspect of the invention is the improved means for analyzing this repetitive wave form. This is accomplished by means of the analyzing circuit shown coupled to photo-multiplier 60 in FIGURE 6. While this circuit has been omitted from FIGURE 2, it is to be understood that the identical circuit could be coupled to the photo-receptor 44. Turning more specifically to FIGURE 6, it will be observed that the output from photo-multiplier 60 is coupled to an amplifier 62 which is provided with a coarse automatic gain control circuit 64 to reduce the dynamic range requirements of subsequent circuits. The signal is then coupled to a bank 66 of band pass filters 68 for spectrum analysis. These filters preferably encompass the entire bandwith of the signal and separate the signal into a plurality of frequency band, or "spatial frequency," components. Each of the band pass filters 68 is coupled to an individual output circuit 70 which may include an amplifier rectifier, and lamp driver circuit for energizing individual indicator lamps 72 of a lamp bank display 74 to provide a visual readout of the spectrum data.

In addition to this spectrum analysis of the signal, it is subjected to what I choose to call "circular harmonic" analysis. One or more (ideally all) of the band pass filters 68 is coupled to a separate detector 76 where the individual spectrum signals are rectified and coupled through an amplifier 78 to a bank 80 of band pass filters 82 which separate the rectified signal into a plurality of frequency bands. Each of these frequency bands will provide a measure of the changes in a particular spatial frequency channel obtained from the image under analysis during one cycle of data extraction. The outputs of the band pass filters 82 are in turn coupled through output circuits 84, which may include an amplifier, rectifier, and lamp driver circuit, to further indicator lamps 86 of lamp bank display 74.

In order to amplify the discussion of circular harmonics, it is convenient to think of the main spectrum channels provided by band pass filter bank 66 as property filters—the property being the associated spatial frequency components which will characterize the image independently of its position or rotation on the field. As the series of impulses of the image signature is sent to the filters 68, the output is a continuous measure of the particular property, or spatial frequency, being monitored. A particular image will, of course, have varying components in the several main spectrum channels; but, more significantly, the successive signatures of that image will have different amounts of a particular spatial frequency. The circular harmonic analysis will provide a measure of these changes in a particular spatial frequency channel obtained from a scene under analysis during one cycle of data extraction. While changes in image size will have associated changes in main spectrum channel outputs, the side-band information over several channels will retain identical circular harmonic content. For example, a ten-spoked wheel on the image field 10 will generate twenty distinct pulses during one cycle of data extraction. These twenty pulses occur in the cycle regardless of the size of the image and regardless of the position or orientation of the image on the field. A wheel with broad strokes will generate maximum side-band signals in a lower frequency channel than will a fine spoke wheel. But the edges of the spokes for both wheels will act as impulses which contribute the twenty pulses per cycle side-band into every filter; this is precisely the edge enhancement characteristic which is desirable in image analysis systems. It will be recognized, of course, that the circular harmonic content of the wave form will vary as the image being analyzed is moved to different positions within the field. Thus, the circular harmonic spectrum analysis may be employed to identify relative image position.

Although a visual read-out of the type afforded by lamp bank 74 will provide useful information as to the characteristics of the image being analyzed, it is to be understood that the outputs from band pass filters 68 and 82 may also be used in conjunction with automatic sorting or character recognitions systems. Thus, it is possible to utilize the outputs of the band pass filters in combination with pattern-matching correlators in the manner shown in FIGURE 7 of U.S. Patent No. 3,036,268. Also, an array of photo-electric means exposed to the light from the indicator lamps of the lamp bank 74 may be utilized for automatically sorting photographs, for example. Of course, rectified replicas of the outputs of the band pass filters may otherwise be employed for actuating switches in an automatic photograph sorting system.

When the field under process contains several images, the final spectrum displays of the several images are superimposed. However, adequate resolution in the filtering process will permit a large degree of multiple signal detection. A system of this type has application in the fields of aerial reconnaissance requiring presorting of large volumes of aerial photographs.

Image detection systems of the invention are also applicable in other areas where volume sorting of photographs is desired. These include the sorting of photographs of blood and tissue cells, of photographs obtained in atomic particle detectors, and of photographs taken from weather satellites.

The invention also has utility in optical navigation systems. Since each point of a field under process will generate a particular frequency modulated signal having a phase and modulation index determined by its position in the field, this can be exploited where sensor or vehicle orientation with respect to an optical beacon (including celestial objects) is desired. In addition, visual image to audio conversion systems useful in reading aids for the blind may be constructed by employing the wave form produced by the photo-multiplier to drive a sound generator.

While two physical implementations of the integral scan system have been disclosed, it is to be understood that other systems based on the principles of the conical transform could be devised. For example, the cylindrical surface 12 of the embodiment in FIGURE 2 could be replaced by a further conical reflector to project the image upon a plane surface where it could be subjected to vidicon or image orthicon scanning. The projected image would then translate along a flat annulus in the plane surface, rotating as it is translated. Grid lines corresponding to the grids 40 would be replaced, in such an embodiment, by radial spokes in the plane projection. A rosette scan of this field would produce image signatures almost identical to those obtained by the embodiments of FIGURES 2 and 6.

Other methods of analyzing the wave form produced by the scanning systems of the invention could be utilized. For example, the wave form could be analyzed on a time domain basis by employing suitably arranged tapped delay lines.

While preferred embodiments of the invention has been shown and described, it will be apparent to those skilled in the art that changes acn be made without departing from the principles and spirit of the invention, the scope of which is defined in the appended claims. Accordingly, the foregoing embodiments are to be considered illustrative, rather than restrictive of the invention, and those modifications which come within the meaning and range of the equivalency of the claims are to be included therein.

The invention claimed is:

1. An image analyzer comprising means for scanning an image to be analyzed by relatively sweeping scanning lines thereacross, said image having a dimension in at least one direction which is greater than the width of said scanning lines, said means for scanning said image comprising means for projecting said image along an optical axis perpendicular thereto, a mirror intersecting said optical axis and inclined thereto, means for rotating said mirror about said optical axis, a relatively stationary sampling cylinder positioned about said optical axis so that said image is reflected from said mirror upon the inner surface of said cylinder, the inner surface of said cylinder being provided with a plurality of light reflective grid lines extending substantially axially thereof, each of said grid lines constituting one of said scanning lines sweeping across said image as said image is translated along said inner surface as said mirror rotates; means responsive to the integral of the light value of the portion of said image within said scanning lines for producing an electrical wave having a wave form which is a function of the integrals of the light values of said image as said scanning lines sweep thereacross positioned to receive reflections of said image from said light reflective grid lines; and means for analyzing said electrical wave form.

2. An image analyzer as recited in claim 1, wherein said angle other than ninety degrees is forty-five degrees.

3. An image analyzer as recited in claim 1, wherein said grid lines are so spaced that only one of said scanning lines sweeps across said image at a time.

4. An image analyzer comprising means for scanning an image to be analyzed by relatively sweeping scanning lines thereacross, said image having a dimension in at least one direction which is greater than the width of said scanning lines, said means for scanning said image comprising a relatively stationary sampling cylinder, the inner surface of said cylinder being provided with a plurality of light reflective grid lines extending substantially axially thereof, a mirror located on and intersecting with the axis of said cylinder and being inclined at an angle other than ninety degrees with respect to said axis, means for rotating said mirror about said axis, said image being located along said axis and perpendicular thereto and being spaced from said mirror, means for reflecting light from said light reflective grid lines upon said mirror so that reflection of said light reflective grid lines will be projected by said mirror along said axis upon said image, each of said deflected grid lines constituting one of said scanning lines, said rotation of said mirror causing said scanning lines to sweep successively across said image at different angles; means responsive to the integral of the light value of the portion of said image within said scanning lines for producing an electrical wave having a wave form which is a function of the integrals of the light values of said image as said scanning lines sweep thereacross; and means for analyzing said electrical wave form.

5. An image analyzer as recited in claim 4, wherein said angle other than ninety degrees is forty-five degrees.

6. An image analyzer as recited in claim 4, wherein said grid lines are so spaced that only one of said scanning lines sweeps across said image at a time.

7. An image analyzer comprising means for scanning an image to be analyzed by relatively sweeping scanning lines thereacross, said image having a dimension in at least one direction which is greater than the width of said scanning lines, said means for scanning said image comprising a relatively stationary sampling cylinder, the inner surface of said cylinder being provided with a plurality of light reflective grid lines extending substantially axially thereof, means for projecting reflections of said light-reflective grid lines upon said image to constitute said scanning lines and for sweeping said scanning lines successively across said image at different angles; means responsive to the integral of the light value of the portion of said image within said scanning lines for producing an electrical wave having a wave form which is a function of the integrals of the light values of said image as said scanning lines sweep thereacross; and means for analyzing said electrical wave form.

8. An image analyzer comprising means for scanning an image to be analyzed by relatively sweeping scanning lines thereacross, said image having a dimension in at least one direction which is greater than the width of said scanning lines, said means for scanning said image comprising a relatively stationary sampling cylinder, a plurality of reflective grid lines on the inner surface of said cylinder extending substantially axially thereof, and means for projecting said image on said inner surface, translating said image along said surface, and rotating said image as it translates along said surface, whereby each of said grid lines will constitute one of said scanning lines sweeping across said image as said image translates along said inner surface; means responsive to the integral of the light value of the portion of said image within said scanning lines for producing an electrical wave having a wave form which is a function of the integrals of the light values of said image as said scanning lines sweep theeracross; and means for analyzing said electrical wave form.

References Cited

UNITED STATES PATENTS

| | | | |
|---|---|---|---|
| 2,933,246 | 4/1960 | Rabinow. | |
| 3,059,521 | 10/1962 | Clemens et al. | 250—233 X |
| 2,981,842 | 4/1961 | Kaufold et al. | 250—203 X |
| 3,061,730 | 10/1962 | Jankowitz | 250—203 |
| 3,144,555 | 8/1964 | Aroyan et al. | 250—203 X |
| 3,153,723 | 10/1964 | Weiss | 250—236 X |
| 3,239,674 | 3/1966 | Aroyan | 250—203 |

WALTER STOLWEIN, Primary Examiner

U.S. Cl. X.R.
250—216, 236